United States Patent [19]
Endo

[11] Patent Number: 5,943,610
[45] Date of Patent: Aug. 24, 1999

[54] TRANSMISSION POWER CONTROL WITH DYNAMIC STEP VALUES

[75] Inventor: Hiroya Endo, Tokyo, Japan

[73] Assignee: NEC Corporation, Tokyo, Japan

[21] Appl. No.: 08/833,135

[22] Filed: Apr. 4, 1997

[30] Foreign Application Priority Data

May 4, 1996 [JP] Japan ..................................... 8-083419

[51] Int. Cl.⁶ ..................................................... H04B 7/26
[52] U.S. Cl. ............................ 455/69; 455/456; 455/522; 455/67.1
[58] Field of Search .............................. 455/456, 10, 522, 455/69, 67.1, 88, 574, 575, 126, 127, 403, 421, 422, 425

[56] References Cited

U.S. PATENT DOCUMENTS

| | | | |
|---|---|---|---|
| 5,128,965 | 7/1992 | Henriksson | 455/69 |
| 5,235,633 | 8/1993 | Dennison et al. | 455/456 |
| 5,442,805 | 8/1995 | Sagers et al. | 455/456 |
| 5,604,766 | 2/1997 | Dohi et al. | 455/69 |
| 5,831,545 | 11/1998 | Murray et al. | 455/69 |
| 5,857,155 | 1/1999 | Hill et al. | 455/522 |

FOREIGN PATENT DOCUMENTS 61-43026  3/1986  Japan .

*Primary Examiner*—Reinhard J. Eisenzopf
*Assistant Examiner*—Lester G Kincaid
*Attorney, Agent, or Firm*—Foley & Lardner

[57] ABSTRACT

Transmission power control with dynamic step value depending on a location of a mobile terminal in a radio zone is realized. The mobile terminal detects its location, whether close to a radio base station, a boundary of the radio zone, or an intermediate location, by an intensity of reception field strength of a radio signal transmitted by a radio base station. The radio base station, which has received and measured the radio signal quality transmitted by the mobile terminal, instructs the transmission power control information (increasing or decreasing) to the mobile terminal in accordance with the measured radio signal quality. When "decreasing" instructions are received repeatedly at the mobile terminal when the mobile terminal is located near the radio base station, a larger step value than a normal case is used for decreasing transmission power of the mobile terminal. When "increasing" instructions are received repeatedly at the mobile terminal when the mobile terminal is located in the boundary of the radio zone, a larger step value than the normal case is used for increasing transmission power of the mobile terminal.

11 Claims, 6 Drawing Sheets

TRANSMISSION POWER CONTROL WITH DYNAMIC STEP VALUES

BACKGROUND OF THE INVENTION

1. Field of the Invention

The present invention relates to a transmission power control system of a mobile terminal in a mobile communication network and a method of transmission power control thereof. More particularly, the present invention concerns a transmission power control in which a quality of a radio signal transmitted from a mobile terminal under communication is measured in a radio base station and the measured result is reported to a radio base station control apparatus, and then in response to the measured quality of the radio signal, the radio base station control apparatus instructs the mobile terminal through the radio base station to change (increase or decrease) the transmission power thereof.

2. Description of the Related Art

Figure 8:
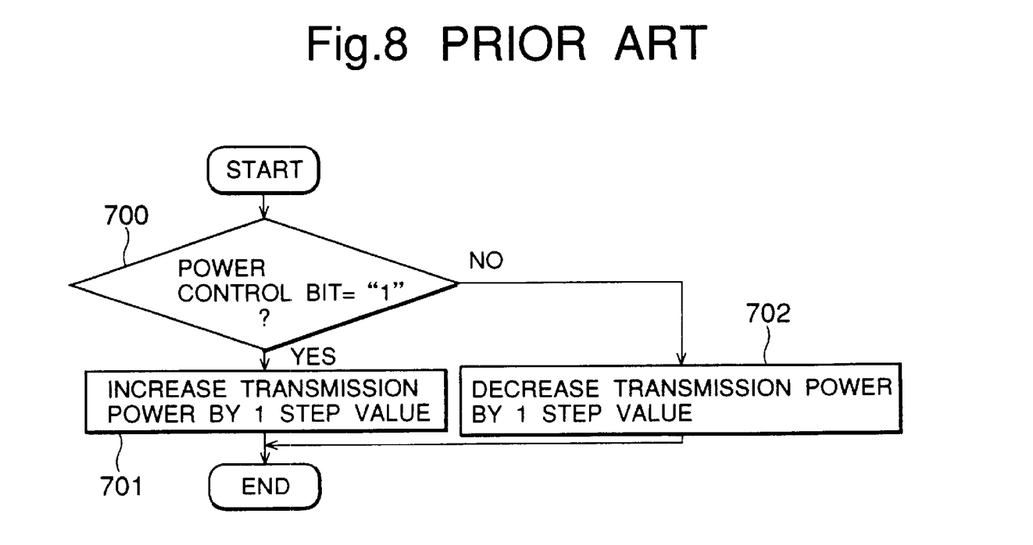
FIG. 8 is a flow chart for describing the operations of the conventional transmission power control method for the mobile terminal.

In general, a mobile communication system is arranged by a plurality of radio base stations for constituting a plurality of radio zones, and a radio base station control apparatus, which entirely controls these plural radio base stations, connected to a mobile communication switching station interfaced with a fixed communication network. FIG. 8 is a flow chart for indicating one example of the conventional transmission power control method for the mobile terminal in such a mobile communication system. The radio base station control apparatus transfers the power control information to the radio base station in response to the radio signal quality of the mobile terminal measured by the radio base station, and the radio base station informs the power control information to the mobile terminal by using the down-stream signal channel. As indicated in FIG. 8, the power control information includes a power control bit to indicate change of power to be transmitted from the mobile terminal. When the power control bit=1, it indicates that the transmission output is to be increased by one step of value which has been predetermined, and, to the contrary, when the power control bit =0, it indicates that the transmission output is to be decreased by one step of value which has also been predetermined. In response to the respective instructions, the mobile terminal increases or decreases the transmission power with a predetermined changing width by 1 step.

Other than such a control method, there is a further method for autonomously controlling the transmission power based upon the reception field strength of the radio signal transmitted from the radio base station and received by this mobile terminal (see Japanese Laid-open Patent Application No. shou 61-43026). Also, in the method of instructing a change in the transmission power from the radio base station control apparatus, number of steps to be changed for increasing, or decreasing the transmission power is instructed.

In the above-described conventional transmission power control method for the mobile terminal, when the mobile terminal autonomously controls the transmission power, this power control is carried out based on the reception field strength at the mobile terminal. As a consequence, this power control will accept a temporal level down in the reception field strength due to such as the fading phenomenon. Therefore, the mobile terminal does not always output the optimum transmission power.

In another case that the transmission power is controlled in response to the instruction issued from the radio base station control apparatus, it will take a lengthy time period until the transmission power output value reaches the optimum value. There is such a problem that since the mobile terminal whose power supply has been just turned ON firstly transmits the radio signal in the maximum transmission power, waste power consumption occurs until this maximum transmission power reaches the optimum transmission power. There is another problem that when the radio signal is transmitted in high power by this mobile terminal, other mobile terminals will receive interference. Therefore, it is required to quickly control the transmission power to become the optimum transmission power within a short time.

SUMMARY OF THE INVENTION

Therefore, a transmission power control system and method for a mobile terminal, according to the present invention, has been made to solve the above-described problems, and has an object such that a time period required when transmission power of the mobile terminal reaches an optimum value is shortened, whereby unnecessary power consumption can be suppressed, and interference adversely given to other mobile terminals can be reduced as much as possible.

In a transmission power control system for a mobile terminal, according to the present invention, the transmission power control system for a mobile terminal is arranged by a plurality of mobile terminals, at least one radio base station, and a radio base station control apparatus which judges a reception field strength of a radio signal received from the mobile terminal and then instructs this mobile terminal to increase or decrease an output value of transmission power thereof. The mobile terminal is featured by comprising the below-mentioned arrangements:

(1) reception field strength measuring means which measures an intensity of reception field strength of a radio signal being communicating with the radio base station in the radio zone thereof;

(2) control means which discriminates an area in a radio zone, where the mobile station being located, by the intensity of reception field strength of measuring result of the reception field strength measuring means, determines a step value to be used for changing transmission power of the mobile terminal depending on discriminated area in the radio zone, detects contents of said instruction provided by the radio base station control apparatus, and outputs transmission power control information, to increase transmission power by the step of value having been determined by the location of the mobile terminal in the radio zone when contents of the instruction being indicating power increase, and to decrease transmission power by the step of value having been determined by the location of the mobile terminal in the radio zone when contents of the instruction being indicating power decrease; and (3) transmission power control means which controls output of transmission power in accordance with an output of the control means.

The control means of the mobile terminal further includes first sub control means which stores a plurality of measuring results of the intensity of reception field strength of the radio signal of the radio base station, comparing with the latest measuring result and past measuring results, being stored, of the intensity of reception field strength of the radio signal of the radio base station, and adds predetermined step value to the determined step value to be used for changing transmission power of the mobile terminal when an intensity difference of comparing result exceeds predetermined threshold value.

Second sub control means in the control means is also a part of the present invention, which counts up number of continued same indication, whether increasing or decreasing, and adds predetermined step value to the determined step value to be used for changing transmission power of the mobile terminal when the counted number reach a predetermined threshold value.

As for a method of transmission power control of the present invention, it comprises the following steps of:

(1) discriminating an area in a radio zone, where the mobile station being located, by measuring an intensity of reception field strength of a radio signal being communicating with the radio base station in the radio zone thereof;
(2) determining a step value to be used for changing transmission power of the mobile terminal depending on discriminated area in the radio zone;
(3) detecting contents of the instruction provided by the radio base station control apparatus;
(4) increasing transmission power by the step of value having been determined by the location of the mobile terminal in the radio zone when contents of the instruction being indicating power increase; and
(5) decreasing transmission power by the step of value having been determined by the location of the mobile terminal in the radio zone when contents of the instruction being indicating power decrease.

The following steps are also a method of the present invention:

(1) measuring an intensity of reception field strength of a radio signal, at the mobile station, being communicating with the radio base station in the radio zone thereof;
(2) storing a plurality of measuring results of the intensity of reception field strength of the radio signal of the radio base station;
(3) discriminating an area in a radio zone, where the mobile station being located, by the latest measuring result of the intensity of reception field strength of the radio signal of the radio base station;
(4) determining a step value to be used for changing transmission power of the mobile terminal depending on discriminated area in the radio zone;
(5) comparing with the latest measuring result and past measuring results, being stored, of the intensity of reception field strength of the radio signal of the radio base station, and adding predetermined step value to the determined step value to be used for changing transmission power of the mobile terminal when an intensity difference of comparing result exceeds predetermined threshold value;
(6) detecting contents of the instruction provided by the radio base station control apparatus;
(7) increasing transmission power by the step of value having been determined as the result of comparison of the latest measuring result and past measuring results of the intensity of reception field strength of the radio signal when contents of the instruction being indicating power increase; and
(8) decreasing transmission power by the step of value having been determined as the result of comparison of the latest measuring result and past measuring results of the intensity of reception field strength of the radio signal when contents of the instruction being indicating power decrease.

BRIEF DESCRIPTION OF THE DRAWINGS

For a better understanding of the present invention, reference is made of a detail description to be read in conjunction with the accompanying drawings, in which.

DETAILED DESCRIPTION OF THE PREFERRED EMBODIMENTS

Referring now to drawings, a transmission power control system according to the present invention will be described.

Figure 1:
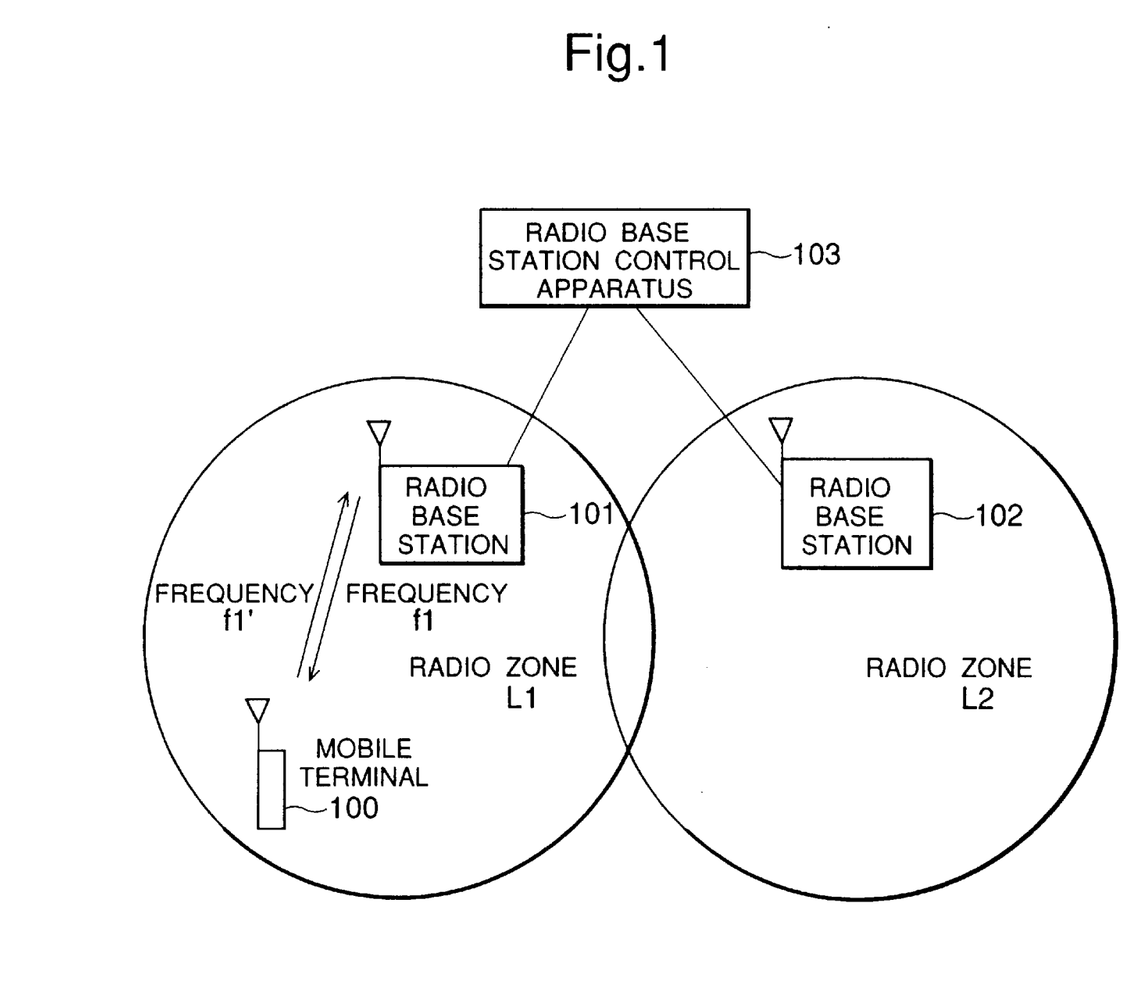
FIG. 1 schematically represents a structural diagram of a mobile communication system to which a transmission power control system and method for a mobile terminal, according to the present invention, is applied.

FIG. 1 is a system arrangement diagram for schematically showing a mobile terminal (portable radio terminal), a radio base station, and a radio base station control apparatus, employed in a transmission power control system and method for a mobile terminal according to the present invention.

That is, the mobile terminal 100 owns a function to transmit and/or receive radio signals having frequencies f1 and f1' with respect to the radio base station 101 in a radio zone L1. Also, the mobile terminal 100 owns another function to measure a reception field strength as to the reception frequency of f1, and a further function to store this measurement value.

The radio base stations 101 and 102 are connected to the radio base station control apparatus 103, and each radio base station owns such a function that data transmission/reception between the radio base station control apparatus 103 and mobile terminals within the constructed radio zone L1 or L2 respectively are repeated by using the allocated radio frequencies. The radio base station 101 has a function to measure a reception field strength as to the reception frequency f1' in order to monitor a quality of a radio signal, and to notify the measurement value to the radio base station control apparatus 103.

The radio base station control apparatus 103 transmits and receives data between the radio base stations 101, 102 connected to this control apparatus 103, and a mobile terminal which is connected to these radio base stations in the wireless manner. This radio base station control apparatus 103 owns a function to monitor the reception field strength of the mobile terminal 100 under communication, and another function to send an instruction to the mobile terminal 100 to increase/decrease the transmission power thereof in response to the measured reception field strength.

Figure 2:
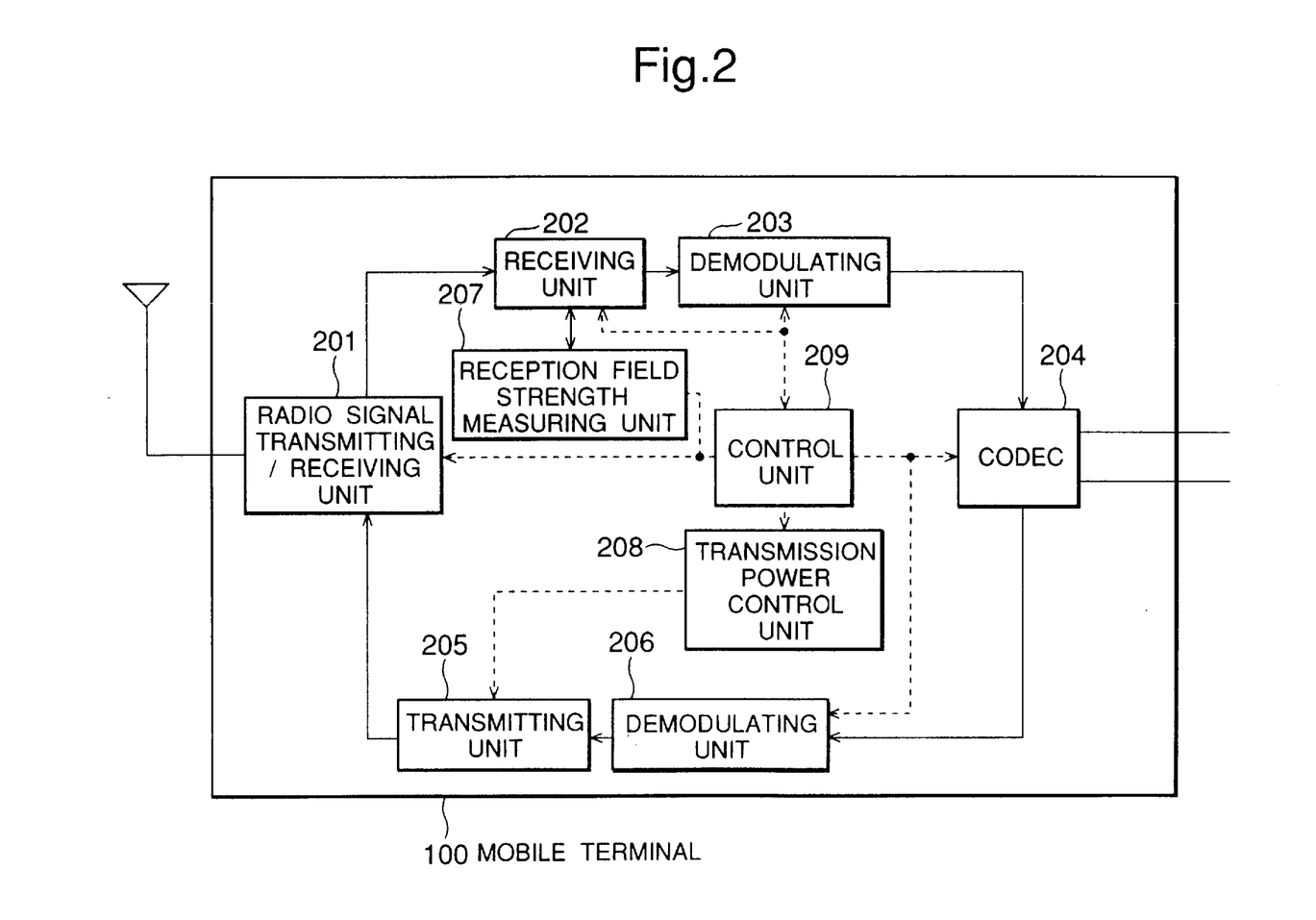
FIG. 2 is a schematic block diagram for indicating an arrangement of a mobile terminal to which the transmission power control system for a mobile terminal according to the present invention is applied.

FIG. 2 is a block diagram for showing an internal arrangement of a mobile terminal employed in the transmission power control system according to a first preferred embodiment of the present invention.

In FIG. 2, a radio signal transmitting/receiving unit 201 is radio-interfaced with the radio base station, and both a receiving unit 202 and a demodulating unit 203 convert a radio reception signal into a digital signal. A CODEC unit 204 performs coding/decoding operations of a speech (voice) signal, and both a transmitting unit 205 and a modulating unit 206 convert a digital signal into a radio transmission signal. A reception field strength measuring unit 207 measures a reception field strength of the radio signal received by the radio transmitting/receiving unit 201. A transmission power control unit 208 controls transmission power in response to an instruction issued from a control unit 209. The control unit 209 connects communication channels involving a radio section, and controls the respective functional blocks. The control unit 209 also has a function to determine an increasing width and a decreasing width of the transmission power based upon the reception field strength, another function to store the measured reception field strength, and another function to instruct the transmission power control unit 208 to increase, or decrease the transmission power.

Figure 3:
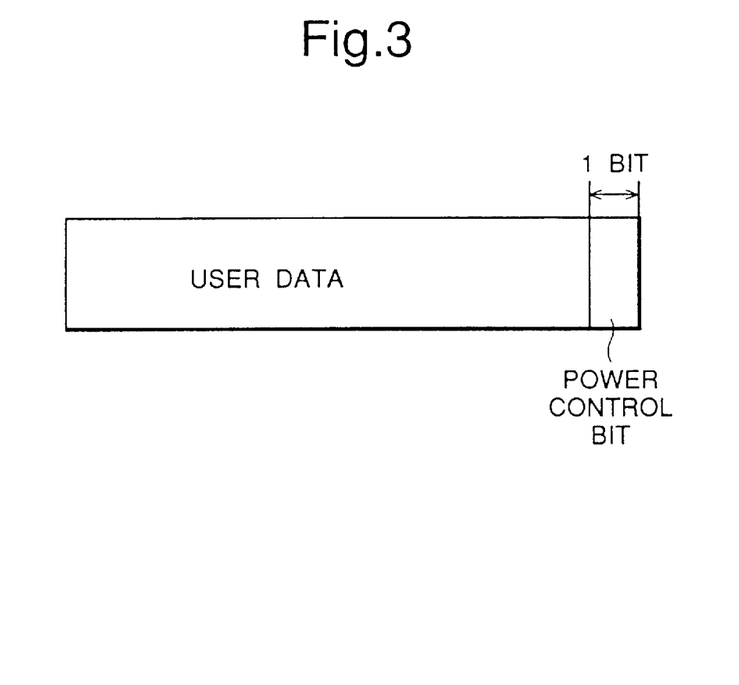
FIG. 3 schematically indicates a signal structural diagram of a burst signal transmitted from a radio base station control apparatus to a mobile terminal.

FIG. 3 schematically indicates a structural diagram of a burst signal of a down-stream link, which is transmitted by a radio base station to a mobile terminal. The radio base station control apparatus controls the transmission power of the mobile terminal based on a power control bit set in this burst signal. In this embodiment, the power control bit="1" instructs the mobile terminal to increase the transmission power thereof, whereas the power control bit="0" instructs the mobile terminal to decrease the transmission power thereof.

Figure 4:
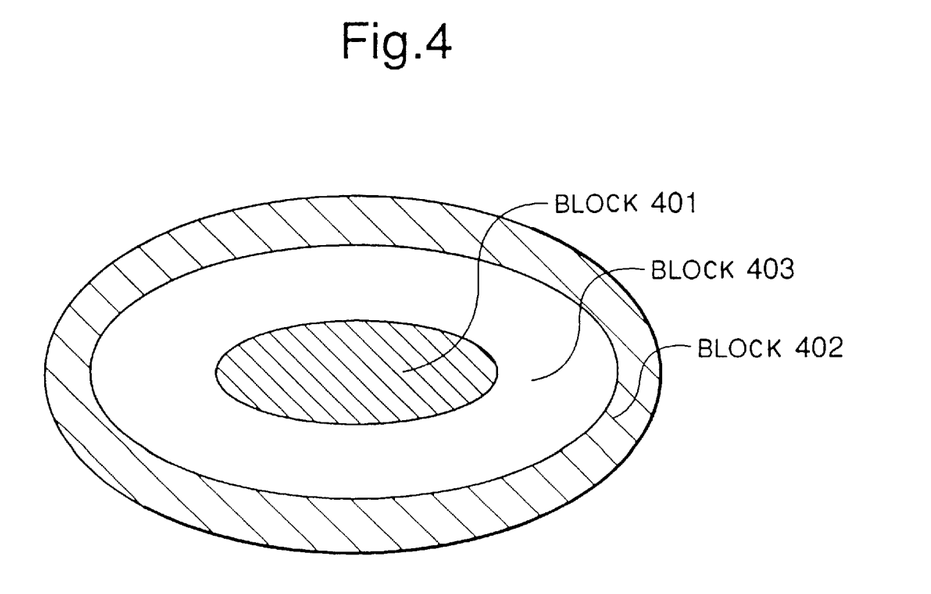
FIG. 4 is a conceptional diagram for representing a radio zone constituted by a radio base station.

FIG. 4 is a conceptional diagram for representing one example of a radio zone, which is divided into some area blocks depending on an intensity of radio field radiated by the radio base station.

In FIG. 4, a block 401 is an area with a high reception field strength, namely, the area located near a center of this radio zone. A block 402 is an area with a low reception field strength, namely the area located near a boundary of the radio zone. A block 403 is an intermediate block between the block 401 and the block 402. The respective area blocks are discriminated from each other based on the reception field strengths measured by the mobile terminal existing in the radio zone thereof. To this end, the mobile terminal owns a first area block discriminating threshold value so as to discriminate the block 401 from the block 403, and a second area block discriminating threshold value in order to discriminate the block 402 from the block 403.

Figure 5:
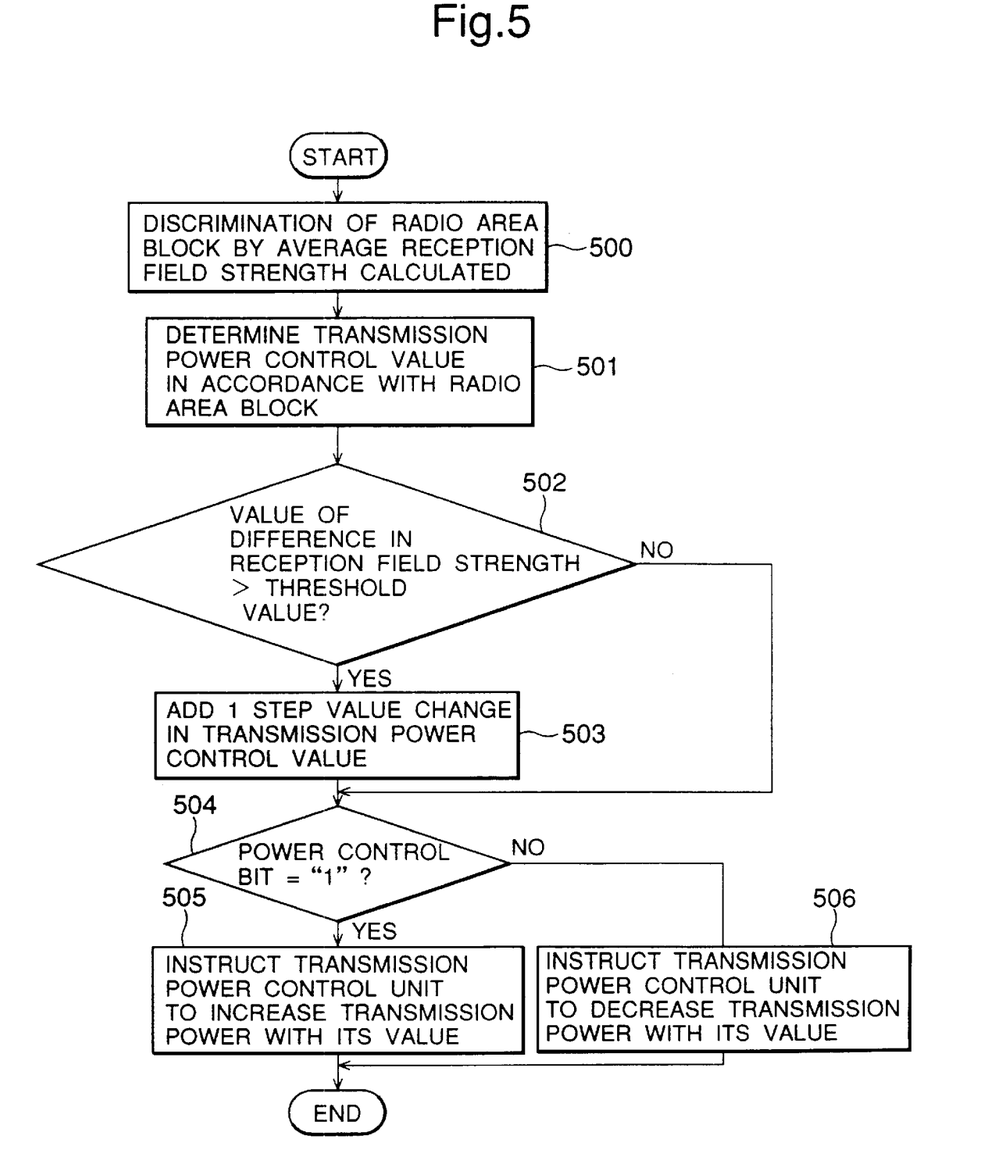
FIG. 5 is a flow chart for explaining operations of the transmission power control method according to a first embodiment of the present invention.

Next, operations of the present invention will now be explained with reference to FIG. 5. FIG. 5 is a flow chart for describing operations of the transmission power control for the mobile terminal according to the first embodiment of the present invention.

It should be noted that in the mobile terminal of FIG. 2, the first area block discriminating threshold value and the second area block discriminating threshold value have been previously set to the control unit 209 so as to discriminate the area blocks from each other, as explained with reference to FIG. 4.

Also, the control unit 209 stores the proper number of reception field strength values having been measured in each time of measurement, and has a function to calculate an average value of these reception field strength values being stored, and further stores a threshold value for reception field strength variation in order to check a changing degree of a reception field strength.

Also, the transmission power control unit 208 is capable of controlling the transmission power under such a condition that a range of 30 dBm is controllable by 0.5 dBm per one step.

In the mobile terminal, the reception field strength of the frequency f1 sent from the radio base station 101 is measured by the reception field strength measuring unit 207, and the measurement result is notified to the control unit 209.

The control unit 209 calculates an average value of reception field strength based upon the notified reception field strength and the proper number of predetermined reception field strengths. Then, the control unit 209 compares this average reception field strength with the first area block discriminating threshold value and the second area block discriminating threshold value in order to judge where the own terminal is located in any one of the area blocks.

The following discrimination is made: When the average value of reception field strength is larger than the first area block discriminating threshold value 1, the mobile terminal is present in the area block 401. When the average reception field strength is smaller than the second area block discriminating threshold value 2, the mobile terminal is present in the area block 402. When the average value of reception field strength exists between the first area block discriminating threshold value and the second area block discriminating threshold value, the mobile terminal is present in the block 403 (step 500).

Then, the increasing width and the decreasing width of the transmission power are determined based on the discrimination result (step 501). For instance, in the case where the mobile terminal is present in the block 401, the unit of the above-described increasing width and decreasing width is set to 3 steps and 1 step, respectively. In the case of block 402, the unit of the above-described increasing width and deceasing width is set to 1 step and 3 steps respectively. In the case of block 403, the unit of the increasing width and decreasing width is set to 1 step and 1 step respectively.

Next, the measured reception field strength is compared with the previous reception field strength which has been measured and stored (step 502).

In such a case that the difference value (comparison result) is larger than the threshold value of reception field strength difference, when the reception field strength is increased, 1 step is added to the increasing width of the transmission power, whereas when the reception field strength is decreased, 1 step is added to the decreasing width of the transmission power (step 503).

The control unit 209 determines the increasing width and the decreasing width of the transmission power, and thereafter acquires the power control bit set in the burst signal received from the radio base station 101. Then, the control unit 209 checks the value set in this power control bit (step 504).

When "1" is set in the power control bit, the control unit 209 instructs the transmission power control unit 208 to increase the transmission power and notifies the increasing width of the transmission power (step 505). When "0" is set in the power control bit, the control unit 209 instructs the transmission power control unit 208 to decrease the transmission power and notifies the decreasing width of the transmission power (step 506).

Then, the transmission power control unit 208 increases or decreases the transmission power in accordance with the instruction about the transmission power, and also the increasing width, or decreasing width of the transmission power, which are received from the control unit 209.

It should be understood that the step numbers used to control the transmission powers at the steps 501 and 502 may be properly selected in the present invention. Also, properly selected number of average reception field strength may be employed instead of the previous reception field strength used at the steps 502 and 503. Also, the decreasing width of the transmission power need not be added which is determined by the changing degree of the reception field strength at the step 503.

Figure 6:
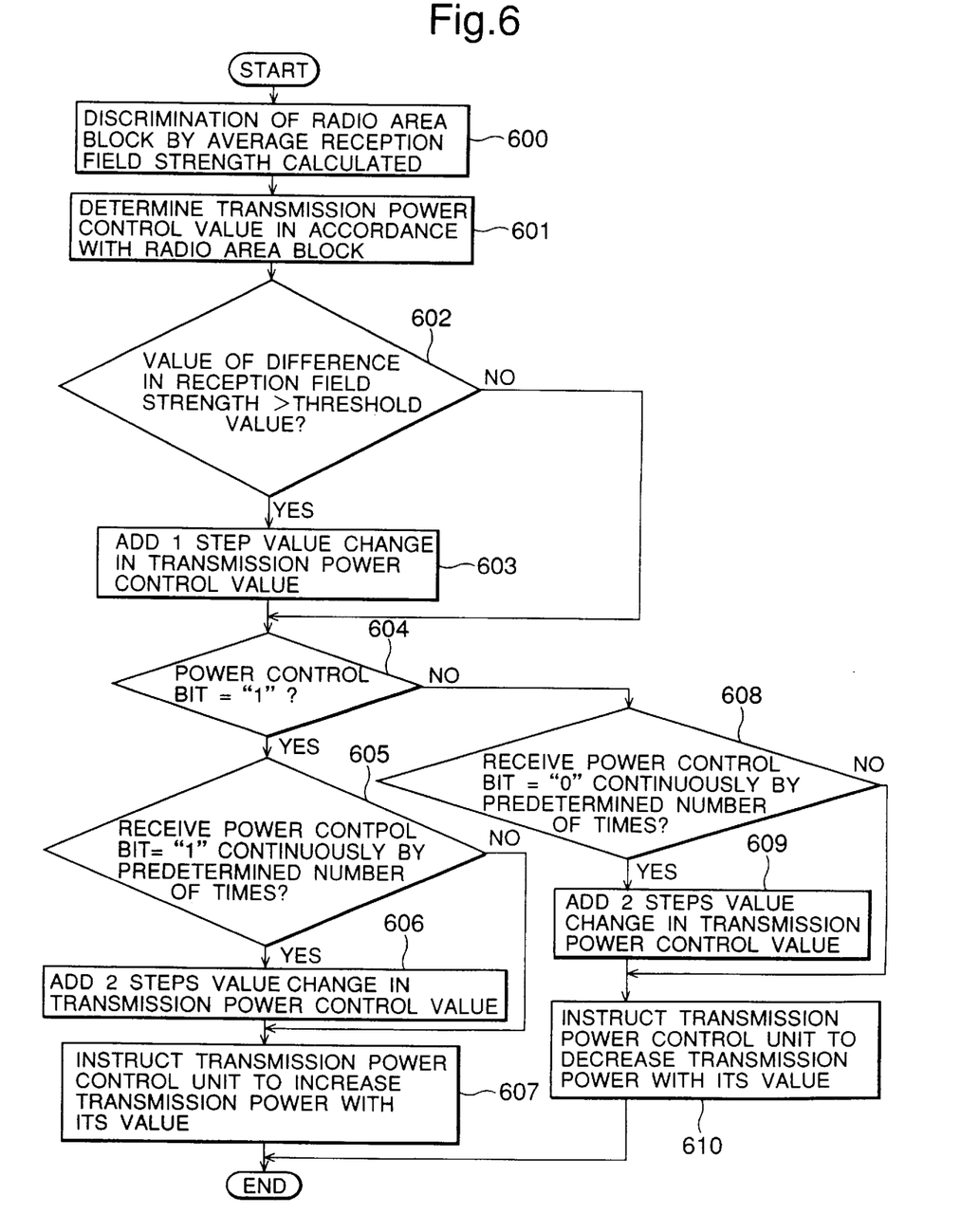
FIG. 6 is a flow chart for explaining operations of the transmission power control method according to a second embodiment of the present invention.

Subsequently, a transmission power control method for mobile terminals according to a second embodiment of the present invention will now be explained with reference to FIG. 6. FIG. 6 is a flow chart for describing operations of the transmission power control for a mobile terminal according to the second embodiment of the present invention.

In the mobile terminal, the control unit 209 owns a function to store the properly selected number of setting values of the power control bit preset to each of the burst signals in addition to the above-explained function of the first embodiment.

Similar to the operations described in the flow chart of FIG. 5, the control unit 209 determines the increasing width and the decreasing width of the transmission power (steps 600 to 603), and thereafter acquires the power control bit contained in the received burst signal to check the value set in this power control bit (step 604).

When "1" is set to this power control bit, the properly selected number of power control bits which have been previously stored are checked. When "1" is continuously received by a predetermined number of times, e.g., 10 times (step 605), 2 steps are added to the increased width of the transmission power (step 606). The control unit 209 determines the increasing width of the transmission power, and thereafter instructs the transmission power control unit 208 to increase the transmission power and also notifies the increasing width of the transmission power (step 607).

When "0" is set at the step 604, the properly selected number of power control bits previously stored are checked. If "0" is continuously received 10 times (step 608), then 2 steps are added to the decreasing width of the transmission power (step 609). The control unit 209 determines the decreasing width of the transmission power, and thereafter instructs the transmission power control unit 208 to decrease the transmission power and notifies the decreasing width of the transmission power.

In response to the instruction about the transmission power and also the increasing width, or the decreasing width of the transmission power received from the control unit 209, the transmission power control unit 208 increases, or decreases the transmission power.

As to such a transmission power control method of the mobile terminal, a concrete embodiment will be explained. The following description is made of such a case that the mobile terminal 100 is located near a center of the radio zone when the power supply is turned ON. It is assumed that in the mobile terminal 100, the transmission power is controllable within a range of 30 dBm by 0.5 dBm per one step, and further this mobile terminal 100 is not moved from the center area of the radio zone after the power supply is turned ON.

The mobile terminal 100 is communicated with the radio base station by setting the transmission power to the maximum power when the power supply is turned ON. On the other hand, the optimum transmission power in the area near the center of the radio zone is equal to the minimum power. That is, in this case, the transmission power of the mobile terminal 100 must be varied from the maximum power to the minimum power. While the maximum power is changed into the minimum power, the power control bit set to the burst signal received from the radio base station is continuously set to "0" until the transmission power of the mobile terminal 100 becomes the optimum transmission power, namely the minimum transmission power. Since the mobile terminal 100 is not moved from the area near the center of the radio zone, there is no variation in the reception field strength.

The mobile terminal 100 judges that the own mobile terminal is located in the block 401 based on the reception field strength measured when the power supply is turned ON, and then determines the 3 steps as the decreasing width of the transmission power (steps 600 and 601). Since there is no change in the reception field strength, no addition of the decreasing width of the transmission power is carried out (step 604). Since the continuous reception times of the power control bit="0" do not reach a preselected time (10 times), the mobile terminal 100 decreases the transmission power by setting the decreasing width of the transmission power to the 3 steps (step 608).

Since there is no variation in the reception field strength because of no movement of the mobile terminal from the original position, the mobile terminal 100 decreases the transmission power by setting the decreasing width of the transmission power to the 3 steps until the number of received burst signals reach 10. When the number of received burst signals reach 10, the 2 steps are added to the decreasing width of the transmission power (steps 608 and 609), and the transmission power is decreased by setting the decreasing width of the transmission power to the 5 steps.

In this second embodiment, a total number of received burst signals until the maximum transmission power of the mobile terminal 100 is changed into the minimum transmission power thereof, namely the transmission power is changed by 30 dBm, is equal to 16 bursts. That is, there are 10 bursts until the transmission power is first reduced to 15 dBm, and there are 6 bursts until the transmission power is reduced to the remaining 15 dBm.

Assuming now that the mobile terminal using conventional power control method decreases the transmission power one step by one step, 60 burst signals should be received until the transmission power is changed to 30 dBm. In comparison with the above-described mobile terminal using conventional power control method, the time period required to reach the optimum transmission power in the mobile terminal using the present invention can become 3.75 times higher than that of the mobile terminal using conventional power control method, namely higher efficiency.

Figure 7:
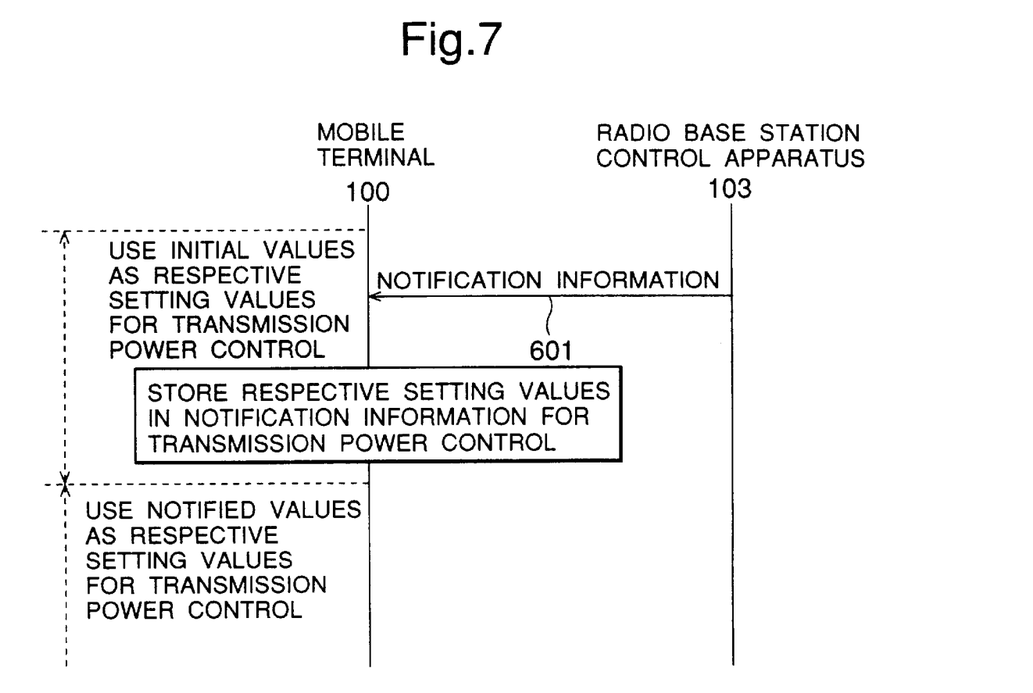
FIG. 7 is a signal sequence diagram for explaining operations of the transmission power control method according to a third embodiment of the present invention.

Furthermore, a description will now be made of a transmission power control method for a mobile terminal according to a third embodiment of the present invention. FIG. 7 is a communication sequence diagram for describing such a case that the radio base station control apparatus notifies the respective setting values used to control the transmission power of the mobile terminal.

In this mobile terminal 100, the following values are stored in the control unit 209 as an initial setting value for previously controlling the transmission power, and then the transmission power is controlled in accordance with this setting value. That is, these values are the number of values of reception field strength to be stored, the first area block discriminating threshold value, the second area block discriminating threshold value, the increasing width/decreasing width of the transmission powers for the respective area blocks, the threshold value of the reception field strength variation, and the number of times and the continuous received number of times of power control bits to be stored.

The radio base station control apparatus 103 notifies the respective setting values as notification information 601 via the radio base stations 101 or 102 to the mobile terminal 100 under communication. When the mobile terminal 100 receives the notification information 601, the control unit 209 stores the respective setting values related to the transmission power control set in this notification information 601, and thereafter carries out the transmission power control in response to this setting value. The radio base station control apparatus 103 continuously notifies the same setting values as the notification information unless there is a change.

According to the present invention, the respective setting values are not limited to the above-explained setting values, which are notified as the notification information 601 used to control the transmission power, but only necessary setting values may be notified.

In accordance with the transmission power control system and method for a mobile terminal of the present invention, it is possible to shorten the time period required to set the transmission power of the mobile terminal to the optimum transmission power. This is because the increasing/decreasing widths of the transmission power are changed in response to the reception field strength and also the changing degree in the reception field strength of the transmission signal received by the own mobile terminal.

Since the time period required up to the optimum transmission power can be reduced, when the transmission power is higher than the optimum transmission power, the time period during which extra power is consumed can be shortened. This may reduce the adverse influences caused by the interference with respect to other mobile terminals. On the other hand, when the transmission power is lower than the optimum transmission power, there is a merit that the communication condition of the own mobile terminal can be quickly kept under better condition.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A transmission power control system for a mobile terminal in a mobile communication network, comprising at least one radio base station coupled with a radio base station control apparatus judging an intensity of reception field strength of a radio signal of said mobile terminal, having been measured and reported from said radio base station, and providing an instruction of transmission power control to said mobile terminal, said transmission power control system for said mobile terminal comprising:

a reception field strength measuring unit configured to measure an intensity of reception field strength of a radio signal being used to communicate with said radio base station in a radio zone thereof;

a control unit communicatively coupled to said reception field strength measuring unit and configured to discriminate an area in said radio zone where said mobile terminal is located from a plurality of candidate areas that make up said radio zone, each candidate area being defined by a corresponding range of distances from said radio base station, the discriminating being made based on the intensity of reception field strength as measured by said reception field strength measuring unit, said control unit configured to determine a step value to be used for changing transmission power of said mobile terminal depending on the discriminated area in said radio zone, said control unit configured to detect contents of said instruction provided by said radio base station control apparatus, and said control unit configured to output transmission power control information, to increase the transmission power by the step value having been determined by the discriminated area of said mobile terminal in said radio zone when the detected contents of said instructions indicate a power increase, and to decrease the transmission power by the step value having been determined by the discriminated area of said mobile terminal in said radio zone when the detected contents of said instruction indicate a power decrease; and a transmission power control unit communicatively coupled to said control unit and configured to control output of transmission power in accordance with an output of said control unit.

2. The transmission power control system for a mobile terminal according to claim 1, said control unit further comprising:

a first sub control unit configured to count up a number of sequentially same indications, whether increasing or decreasing, and configured to add a predetermined step value to the determined step value to be used for changing the transmission power of said mobile terminal when the counted number reaches a first predetermined threshold value.

3. The transmission power control system for a mobile terminal according to claim 1, wherein said plurality of candidate areas include a first candidate area which corresponds to a center of said radio zone, a second candidate area which corresponds to an outer boundary of said radio zone, and a third candidate area which is located between said first and second candidate areas.

4. A transmission power control system for a mobile terminal in a mobile communication network, comprising at least one radio base station coupled with a radio base station control apparatus judging an intensity of reception field strength of a radio signal of said mobile terminal, said reception field strength having been measured and reported from said radio base station, and providing an instruction of transmission power control to said mobile terminal, said transmission power control system for said mobile terminal comprising:

a reception field strength measuring unit configured to measure an intensity of the reception field strength of a radio signal being used to communicate with said radio base station in a radio zone thereof;

a control unit communicatively coupled to said reception field strength measuring unit and configured to discriminate an area in said radio zone where said mobile terminal is located, the discriminating being made based on the intensity of reception field strength as measured by said reception field strength measuring unit, said control unit configured to determine a step value to be used for changing transmission power of said mobile terminal depending on the discriminated area in said radio zone, said control unit configured to detect contents of said instruction provided by said radio base station control apparatus, and said control unit configured to output transmission power control information, to increase the transmission power by the step value having been determined by the discriminated area of said mobile terminal in said radio zone when the detected contents of said instructions indicate a power increase, and to decrease the transmission power by the step value having been determined by the discriminated area of said mobile terminal in said radio zone when the detected contents of said instruction indicate a power decrease; and a transmission power control unit communicatively coupled to said control unit and configured to control output of transmission power in accordance with an output of said control unit, said control unit further comprising:
  a first sub control unit configured to store a plurality of measuring results of the intensity of reception field strength of the radio signal of said radio base station, said first sub control unit configured to compare with a latest measuring result and past measuring results, being stored, of the intensity of reception field strength of the radio signal of said radio base station, and said first sub control unit configured to add a predetermined step value to the determined step value to be used for changing transmission power of said mobile terminal when an intensity difference of the comparing result exceeds a first predetermined threshold value.

5. The transmission power control system for a mobile terminal according to claim 4, said control unit further comprising:
  a first sub control unit configured to count up a number of sequentially same indications, whether increasing or decreasing, and configured to add the predetermined step value to the determined step value to be used for changing the transmission power of said mobile terminal when the counted number reaches the first predetermined threshold value.

6. A method of transmission power control system for a mobile terminal in a mobile communication network, comprising at least one radio base station coupled with a radio base station control apparatus judging an intensity of reception field strength of a radio signal of said mobile terminal, having been measured and reported from said radio base station, and providing an instruction of transmission power control to said mobile terminal, said method comprising:
  discriminating an area in a radio zone where said mobile terminal is located from a plurality of candidate areas that make up said radio zone, each candidate area being defined by a corresponding range of distances from said radio base station, by measuring an intensity of reception field strength of a radio signal, at said mobile terminal, being used to communicate with said radio base station in said radio zone thereof;
  determining a step value to be used for changing a transmission power of said mobile terminal depending on the discriminated area in said radio zone;
  detecting contents of said instruction provided by said radio base station control apparatus;
  increasing the transmission power by the step value having been determined by the discriminated area of said mobile terminal in said radio zone when the detected contents of said instruction indicate a power increase; and
  decreasing the transmission power by the step value having been determined by the discriminated area of said mobile terminal in said radio zone when the detected contents of said instruction indicate a power decrease.

7. The method according to claim 6, wherein said plurality of candidate areas include a first candidate area which corresponds to a center of said radio zone, a second candidate area which corresponds to an outer boundary of said radio zone, and a third candidate area which is located between said first and second candidate areas.

8. A method of transmission power control for a mobile terminal in a mobile communication network, comprising at least one radio base station coupled with a radio base station control apparatus judging an intensity of reception field strength of a radio signal of said mobile terminal, having been measured and reported from said radio base station, and providing an instruction of transmission power control to said mobile terminal, said method comprising:
  measuring an intensity of reception field strength of a radio signal, at said mobile terminal, being used to communicate with said radio base station in said radio zone thereof;
  storing a plurality of measuring results of the intensity of reception field strength of the radio signal of said radio base station;
  discriminating an area in a radio zone, where said mobile terminal is located, by the latest measuring result of the intensity of reception field strength of the radio signal of said radio base station;
  determining a step value to be used for changing a transmission power of said mobile terminal depending on the discriminated area in said radio zone;
  comparing with the latest measuring result and past measuring results, being stored, of the intensity of reception field strength of the radio signal of said radio base station, and adding a fixed step value to the determined step value to be used for changing the transmission power of said mobile terminal when an intensity distribution of the comparing result exceeds a fixed threshold value;
  detecting contents of said instruction provided by said radio base station control apparatus;
  increasing the transmission power by the step value having been determined as the result of comparison of the latest measuring result and past measuring results of the intensity of reception field strength of the radio signal when the detected contents of said instruction indicate a power increase; and
  decreasing the transmission power by the step value having been determined as the result of comparison of the latest measuring result and past measuring results of the intensity of reception field strength of the radio signal when the detected contents of said instruction indicate a power decrease.

9. A method of transmission power control for a mobile terminal in a mobile communication network, comprising at least one radio base station coupled with a radio base station control apparatus judging an intensity of reception field strength of a radio signal of said mobile terminal, having been measured and reported from said radio base station, and providing an instruction of transmission power control to said mobile terminal, said method comprising:
  discriminating an area in a radio zone where said mobile terminal is located from a plurality of candidate areas that make up said radio zone, each candidate area being defined by a corresponding range of distances from said radio base station the discriminating being made by measuring an intensity of reception field strength of a radio signal, at said mobile terminal, being used to communicate with said radio base station in said radio zone thereof;

determining a step value to be used for changing a transmission power of said mobile terminal depending on the discriminated area in said radio zone;

detecting contents, whether indicating increase or decrease, of said instruction provided by said radio base station control apparatus;

counting up a number of sequentially same indications, and adding a fixed step value to the determined step value to be used for changing transmission power of said mobile terminal when the counted number reaches a fixed threshold value;

increasing the transmission power by the step value having been determined as the result of counting up the number of sequentially same indications when the detected contents of said instruction indicate a power increase; and decreasing the transmission power by the step value having been determined as the result of counting up the number of sequentially same indications when the detected contents of said instruction indicate a power decrease.

10. The method according to claim 9, wherein said plurality of candidate areas include a first candidate area which corresponds to a center of said radio zone, a second candidate area which corresponds to an outer boundary of said radio zone, and a third candidate area which is located between said first and second candidate areas.

11. A method of transmission power control for a mobile terminal in a mobile communication network, comprising at least one radio base station coupled with a radio base station control apparatus judging an intensity of reception field strength of a radio signal of said mobile terminal, having been measured and reported from said radio base station, and providing an instruction of transmission power control to said mobile terminal, said method comprising:

measuring an intensity of reception field strength of a radio signal, at said mobile terminal, being used to communicate with said radio base station in said radio zone thereof;

storing a plurality of measuring results of the intensity of reception field strength of the radio signal of said radio base station;

discriminating an area in a radio zone, where said mobile terminal is located, by the latest measuring result of the intensity of reception field strength of the radio signal of said radio base station;

determining a step value to be used for changing a transmission power of said mobile terminal depending on the discriminated area in said radio zone;

comparing with the latest measuring result and past measuring results, being stored, of the intensity of reception field strength of the radio signal of said radio base station, and adding a fixed step value to the determined step value to be used for changing the transmission power of said mobile terminal when an intensity distribution of the comparing result exceeds a fixed threshold value;

detecting contents of said instruction provided by said radio base station control apparatus;

counting up a number of sequentially same indications, and adding a fixed step value to the determined step value to be used for changing transmission power of said mobile terminal when the counted number reaches a fixed threshold value;

increasing the transmission power by the step value having been determined, as the result of comparison of the latest measuring result and past measuring results of the intensity of reception field strength of the radio signal, and as the result of counting up the number of sequentially same indications when the detected contents of said instruction indicate a power increase; and decreasing the transmission power by the step value having been determined, as the result of comparison of the latest measuring result and past measuring results of the intensity of reception field strength of the radio signal, and as the result of counting up the number of sequentially same indications when the detected contents of said instruction indicate a power decrease.

* * * * *